(12) United States Patent
Kellner et al.

(10) Patent No.: US 12,145,433 B2
(45) Date of Patent: Nov. 19, 2024

(54) VEHICLE SUBSTRUCTURE FOR AN AT LEAST SEMI-ELECTRICALLY DRIVEN MOTOR VEHICLE

(71) Applicant: Dr. Ing. h.c. F. Porsche Aktiengesellschaft, Stuttgart (DE)

(72) Inventors: Philipp Kellner, Renningen-Malmsheim (DE); Andreas Munzert, Gerlingen (DE); Christopher Volkmer, Niefern-Öschelbronn (DE); Sebastian Ortmann, Hamburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 6 days.

(21) Appl. No.: 18/122,210

(22) Filed: Mar. 16, 2023

(65) Prior Publication Data

US 2023/0311632 A1    Oct. 5, 2023

(30) Foreign Application Priority Data

Mar. 30, 2022   (DE) .................... 10 2022 107 486.2

(51) Int. Cl.
*B60L 50/60* (2019.01)
*B60K 1/04* (2019.01)

(52) U.S. Cl.
CPC ............ *B60K 1/04* (2013.01); *B60L 50/66* (2019.02); *B60K 2001/0438* (2013.01); *B60Y 2306/01* (2013.01)

(58) Field of Classification Search
CPC .... B60K 2001/0438; B60K 2001/0416; B60K 1/04; B60Y 2306/01; B60S 5/06; B60L 50/66
See application file for complete search history.

(56) References Cited

U.S. PATENT DOCUMENTS 5,534,364 A  *  7/1996  Watanabe ........... H01M 50/244
                                                     429/150
7,614,473 B2 * 11/2009  Ono ........................ B60L 1/003
                                                     180/291

(Continued)

FOREIGN PATENT DOCUMENTS

CN        210337551 U        4/2020
CN        111674270 A   *    9/2020

(Continued)

OTHER PUBLICATIONS

CN 210337551 U machine translation from espacenet.com (Year: 2024).*

(Continued)

*Primary Examiner* — Paul N Dickson
*Assistant Examiner* — Maxwell L Meshaka
(74) *Attorney, Agent, or Firm* — Buchanan Ingersoll & Rooney PC

(57) ABSTRACT

A vehicle substructure for a motor vehicle driven at least semi-electrically including at least one chassis auxiliary frame for a rear axle chassis and a battery system arranged in a forward travel direction in front of the chassis auxiliary frame with a battery support structure for receiving at least one battery device. The battery support structure is connected to the body. A mounting carrier serves to transfer a load from the chassis auxiliary frame into the battery support structure in a crash event. The mounting carrier is suitable and configured so as to fixedly connect the chassis auxiliary frame and the battery system to one another prior to being installed in the vehicle, thereby providing a pre-mounting assembly. The mounting carrier can be downwardly disengaged from the chassis auxiliary frame and the battery system after the marriage has been established.

14 Claims, 3 Drawing Sheets

(56) References Cited

U.S. PATENT DOCUMENTS

| | | | | |
|---|---|---|---|---|
| 7,913,788 B1* | 3/2011 | Bryer | ................ | B60K 1/04 180/69.1 |
| 8,616,319 B2* | 12/2013 | Yokoyama | ........ | H01M 50/249 180/68.5 |
| 9,682,723 B2* | 6/2017 | Weinlader | ............ | B62D 11/006 |
| 9,884,545 B1* | 2/2018 | Addanki | ............ | B60L 50/64 |
| 9,937,781 B1* | 4/2018 | Bryer | ............ | B62D 35/02 |
| 10,005,495 B2* | 6/2018 | Töller | ............ | B62D 21/155 |
| 10,124,694 B2* | 11/2018 | Yang | ............ | B60L 53/00 |
| 10,518,621 B2 | 12/2019 | Nitta et al. | | |
| 11,027,618 B2* | 6/2021 | Kamikihara | ............ | B60L 50/64 |
| 11,167,798 B1 | 11/2021 | Butukuri et al. | | |
| 11,201,374 B2* | 12/2021 | Leradi | ............ | H01M 50/209 |
| 11,565,579 B2* | 1/2023 | Kellner | ............ | B62D 27/065 |
| 11,685,441 B2* | 6/2023 | Woo | ............ | B62D 21/12 296/204 |
| 11,970,214 B2* | 4/2024 | Kim | ............ | B60L 50/66 |
| 2003/0066694 A1* | 4/2003 | Mita | ............ | B60K 1/00 180/65.1 |
| 2004/0194313 A1* | 10/2004 | Chernoff | ............ | B23P 21/00 29/428 |
| 2005/0039964 A1* | 2/2005 | Goyry | ............ | B60W 10/08 180/68.5 |
| 2006/0289224 A1* | 12/2006 | Ono | ............ | B60L 1/003 180/311 |
| 2007/0051549 A1 | 3/2007 | Fukuda | | |
| 2008/0283317 A1* | 11/2008 | Wagner | ............ | B60R 16/04 180/68.5 |
| 2008/0283318 A1* | 11/2008 | Wagner | ............ | B62D 21/152 180/68.5 |
| 2009/0152034 A1* | 6/2009 | Takasaki | ............ | B60L 50/52 180/68.5 |
| 2009/0242299 A1* | 10/2009 | Takasaki | ............ | B60L 50/66 180/68.5 |
| 2011/0315464 A1* | 12/2011 | Yokoyama | ............ | H01M 50/249 180/68.5 |
| 2012/0111528 A1* | 5/2012 | Takeuchi | ............ | B60L 58/26 165/41 |
| 2012/0153718 A1* | 6/2012 | Rawlinson | ............ | H02K 7/006 307/10.1 |
| 2013/0119706 A1* | 5/2013 | Katayama | ............ | B62D 21/152 296/187.09 |
| 2014/0174840 A1* | 6/2014 | Knoblauch | ............ | B62D 21/155 180/68.5 |
| 2015/0150189 A1* | 6/2015 | Weinlader | ............ | B62D 11/006 56/11.2 |
| 2016/0068195 A1 | 3/2016 | Hentrich et al. | | |
| 2017/0129540 A1* | 5/2017 | Töller | ............ | B62D 21/155 |
| 2017/0182908 A1* | 6/2017 | Yang | ............ | B60L 53/00 |
| 2020/0156485 A1* | 5/2020 | Kamikihara | ............ | B62D 21/11 |
| 2020/0353807 A1* | 11/2020 | Kellner | ............ | B62D 27/065 |
| 2021/0143381 A1* | 5/2021 | Ieradi | ............ | H01M 10/625 |
| 2022/0149458 A1* | 5/2022 | Jiang | ............ | H01M 10/6556 |
| 2022/0242491 A1* | 8/2022 | Woo | ............ | B62D 21/07 |
| 2023/0042713 A1* | 2/2023 | Kucab | ............ | B60B 35/16 |
| 2023/0249756 A1* | 8/2023 | Kellner | ............ | B32B 15/046 428/409 |
| 2023/0311632 A1* | 10/2023 | Kellner | ............ | B62D 21/15 180/271 |
| 2023/0311794 A1* | 10/2023 | Mukaigawa | ......... | B62D 21/155 180/68.5 |
| 2023/0373285 A1* | 11/2023 | Volkmer | ............ | H01M 50/271 |

FOREIGN PATENT DOCUMENTS

| | | | |
|---|---|---|---|
| CN | 115556597 A | * | 1/2023 |
| CN | 218949300 U | * | 5/2023 |
| DE | 3522447 A1 | | 7/1986 |
| DE | 102012010897 B3 | | 11/2013 |
| DE | 102018214265 A1 | | 2/2019 |
| EP | 2986486 A1 | | 2/2016 |

OTHER PUBLICATIONS

Great Britain Combined Search and Examination Report for Application No. GB2304647.7, dated Sep. 25, 2023, 2 pages.

* cited by examiner

VEHICLE SUBSTRUCTURE FOR AN AT LEAST SEMI-ELECTRICALLY DRIVEN MOTOR VEHICLE

CROSS-REFERENCE TO RELATED APPLICATION

This application claims priority to German Patent Application No. 10 2022 107 486.2, filed Mar. 30, 2022, the content of such application being incorporated by reference herein in its entirety.

FIELD OF THE INVENTION

The present invention relates to a vehicle substructure for an at least semi-electrically driven motor vehicle having at least one chassis auxiliary frame for a rear axle chassis and at least one battery system arranged in a forward travel direction in front of the chassis auxiliary frame. The chassis auxiliary frame is connected to a body in the region of a rear carriage. The battery system comprises at least one battery support structure for receiving at least one battery device. The battery support structure is connected to the body.

BACKGROUND OF THE INVENTION

Such a vehicle substructure must typically meet a variety of specifications. For example, as high a safety as possible in a crash event and in particular in a rear impact event must be ensured. In addition, the battery system must be protected as well as possible. This applies both during driving operation and an accident as well as during the time before and during installation of the battery system in the vehicle. Furthermore, a weight reduction and a compact and space-saving design are generally desirable in order to enable as long a range as possible with the energy reservoir.

In vehicles with steerable rear wheels, there is also the need that sufficient construction space be available for the components of the rear axle steering and for the movement space of the rear wheels. A further requirement is that such a vehicle substructure can be mounted or installed as effortlessly and economically as possible. In addition, the vehicle substructure mounted in the finished vehicle is to be as readily and easily accessible as possible for maintenance or repair work.

A vehicle rear structure having a battery housing for a battery and a rear load transfer element is known from DE 10 2018 214 265 A1, which is incorporated by reference herein.

The rear load transfer element is arranged behind the battery housing and transfers a collision load forward during a collision. To transfer the collision loads, fittings are provided that extend from the rear load transfer element forwardly below the battery housing.

SUMMARY OF THE INVENTION

The vehicle substructure according to aspects of the invention is provided for an at least semi-electrically driven vehicle (in particular with steerable rear wheels). The vehicle substructure comprises at least one chassis auxiliary frame for a rear axle chassis, which is connected to a body in the region of a rear carriage. The vehicle substructure comprises at least one battery system arranged in a forward travel direction in front of the chassis auxiliary frame. The battery system comprises at least one battery support structure for receiving at least one battery device. The battery support structure is (at least partially) connected to the body. In particular, the battery system is connected to the body via the battery support structure. The vehicle substructure comprises at least one mounting carrier. The mounting carrier serves to transfer a load from the chassis auxiliary frame into the battery support structure in a crash event, in particular in a rear impact event. The mounting carrier is suitable and configured so as to fixedly connect the chassis auxiliary frame and the battery system to one another prior to being installed in the vehicle. In particular, the mounting carrier allows a simultaneous assembly of the chassis auxiliary frame and the battery system. In doing so, a pre-mounting assembly is provided. The pre-mounting assembly is configured so as to be married as a unit to the body. In particular, the pre-mounting assembly is mountable as a unit on the body. The mounting carrier is adapted and configured so as to be downwardly disengaged (and disassembled) from the chassis auxiliary frame and from the battery system upon marriage of the pre-mounting assembly to the body (in the vehicle vertical direction). Thus, the chassis auxiliary frame and the battery system are independently dismountable from the body (and, in particular, in any sequence). In particular, the mounting carrier can be dismounted with the battery system installed and with the chassis support frame installed. In particular, the battery system and chassis auxiliary frame are attached to the body in such a way that they are still at least partially connected to the body, even when the mounting carrier is removed.

The present invention offers many advantages. The mounting carrier offers a significant advantage with its special installation and its functionality in cooperation with the other components of the vehicle substructure. As a result, the invention can meet the specifications for such a vehicle substructure particularly extensively and advantageously.

For example, the invention offers particularly high crash safety and at the same time an effortless and secure assembly as well as good accessibility for maintenance work on both the battery system and the rear axle chassis (with steerable rear wheels).

In all embodiments, it is particularly preferred and advantageous that the mounting carrier comprises at least three support arms. In particular, only three support arms are provided.

Preferably, the three support arms form the main structure of the mounting carrier. The mounting carrier can also be (substantially) formed by the three support arms. In particular, the mounting carrier is to be handled as a single component. In particular, the mounting carrier is pre-assembled.

The three support arms are preferably provided by at least one base support arm extending in the vehicle vertical direction and at least two side support arms attached to the base support arm at an angle (obliquely). In particular, the side support arms are not fixed at right angles to the base support arm. In particular, the mounting carrier is configured trapezoidally (due to the orientation of the at least three support arms). In other words, the mounting carrier preferably has a trapezoidal base geometry. This basic geometry can also be referred to as iron-like.

The base support arm is in particular supported on and/or attached to the auxiliary frame. The side support arms are in particular supported on and/or attached to the battery support structure. The support arms are in particular fixedly connected to one another. In particular, the side support arms are attached to the base support arm. In particular, the side support arms are arranged in a plane. In particular, the side support arms and the base support arm are arranged in one plane. In particular, the base support arm extends transversely to the side support arms. In particular, the side support arms are attached to the base support arm and preferably to its ends with their ends (i.e. terminally). The mounting carrier can be integrally formed. Then, for example, a carrier is formed accordingly so that the base support with the two side support arms results.

It is preferred and advantageous that the mounting carrier is arranged zero to 200 mm above an underbody clearance line in relation to a vehicle vertical axis. In this region, the mounting carrier offers particular advantages in terms of crash safety and pre-mounting as well as during maintenance operations. In particular, the underbody clearance line runs along a lowest point of an underbody of the vehicle.

Preferably, the mounting carrier is arranged at the same height as the frame longitudinal carriers of the chassis auxiliary frame and/or at the same height as the battery support structure and in particular their battery longitudinal carriers and/or at the same height as the rockers. In particular, the mounting carrier lies lower than the longitudinal carrier units of the body in the rear carriage. In particular, the mounting carrier extends at least at a majority in the forward travel direction in front of the longitudinal carrier units. These components will be described in further detail below.

In an advantageous further development, the mounting carrier provides at least one protection apparatus. The protection apparatus protects the battery system against mechanical impacts in particular before and/or during installation into the pre-mounting assembly and/or into the vehicle. In particular, the protection apparatus protects the battery system before and/or during the marriage of the pre-mounting assembly to the body. In particular, the mounting carrier performs structural functions in the protection of the battery system. In particular, the protection apparatus protects the battery system during all handling of the battery system as part of the mounting.

This provides further advantageous functional integration of the mounting carrier. Such protection of the battery system before its installation is increasingly a certification-relevant feature for battery systems and electric vehicles. In the invention, the battery system no longer must be protected with weight-intensive additional components separately and with great effort. Therefore, by using the mounting carrier, structural changes to already developed battery systems can also be omitted.

In a particularly advantageous further development, the chassis auxiliary frame (in particular its frame longitudinal carrier) and the mounting carrier and the battery support structure (in particular its battery longitudinal carrier) together provide a lower load transfer plane for load transfer in a crash event. This provides further advantageous functional integration of the mounting carrier and a significant improvement in vehicle safety.

Preferably, the chassis auxiliary frame supports itself on the base support arm in a crash event. In particular, the chassis auxiliary frame supports itself with its frame longitudinal carriers on the base support arm. In particular, the load introduced by the chassis auxiliary frame is transferable from the base support arm via the side support arms forwardly (in other words: oblique to the vehicle longitudinal direction in the forward travel direction) and outwardly (in other words: oblique to the vehicle transverse direction) into the battery structure and in particular into its battery longitudinal carrier. In particular, the load from the battery support structure is preferably also passed into the rockers and/or other portions of the body. In particular, the load introduced in a crash event is passed from the chassis auxiliary frame on the base support arm and from there via the side support arms to the battery support structure and preferably from there into the body.

In particular, the vehicle substructure comprises at least two longitudinal carrier units arranged in the rear carriage. In particular, the longitudinal carrier units are arranged at least partially higher than the chassis auxiliary frame. In particular, the longitudinal carrier units are fixedly connected to the body. In particular, the vehicle substructure comprises at least two rockers arranged in the forward travel direction in front of the longitudinal carrier units. In particular, the rockers are fixedly connected to the body. The rockers are in particular arranged lower than the longitudinal carrier units and/or laterally in relation to the battery system. The rockers in particular extend parallel to the battery longitudinal carriers.

In particular, the vehicle substructure comprises at least two crank structures which can be loaded to bending (in a crash event) for transferring a load from at least one respective longitudinal carrier unit to at least one respective rocker in a crash event. In particular, the longitudinal carrier units and the crank structures and the rockers together provide an upper load transfer plane for the load transfer in a crash event. In particular, the upper load transfer plane is arranged, at least in sections, higher than the lower load transfer plane. In particular, the lower load transfer plane is configured as a supplement to the upper load transfer plane. In particular, the lower and upper load transfer planes together form load transfer from the rear carriage into the body in the forward vehicle direction intended for the rear impact event.

The longitudinal carrier units are in particular arranged higher than the mounting carrier and/or higher than the battery support structure. In particular, the longitudinal carrier units extend, at least in sections, above the chassis auxiliary frame. The rockers are in particular configured as side rockers.

It is possible that the crank structures have purposefully reduced component dimensions for gaining design space for steerable rear wheels. In particular, the crank structures have a reduced cross-sectional geometry and/or a reduced usage of material. It is preferred and advantageous that a load transfer in the upper load transfer plane reduced by the smaller component dimensions is at least compensated and preferably more than compensated by the lower load transfer plane. In particular, the reduced component dimensions serve to provide a larger steering angle for the rear wheels.

It is possible and advantageous that the mounting carrier comprises at least one extrusion profile or is configured as such. In particular, the support arms each comprise at least one extrusion profile or are provided as such. Other suitable types of profile components are also possible.

The battery system can comprise at least one battery protection plate for protecting against roadside mechanical influences. In particular, the mounting carrier comprises a mounting device for fastening the battery protection plate from the bottom (in the vehicle vertical direction). The mounting device is used in particular for fastening the battery protection plate by means of screw connections. In particular, the battery protection plate is attached to the mounting device with a rear part.

In an advantageous further development, the support arms of the mounting carrier span a receiving space. The receiving space is in particular used for accommodating at least one electronic control device of the battery system. In particular, a mounting flange for fastening the control device is configured on at least one support arm.

In particular, the battery support structure comprises at least two longitudinally extending battery supports in the vehicle longitudinal direction. In particular, the battery longitudinal carrier units are each connected to one of the side support arms with their rear end. In particular, the battery longitudinal carriers are connected to a frontward end of the side support arms. In particular, the battery longitudinal carriers are external and lateral in relation to the battery system. In particular, the battery longitudinal carriers terminate the battery system in at least the vehicle transverse direction. In particular, the battery longitudinal carriers each lie between the battery device and a rocker. The battery longitudinal carriers can be connected to a rocker and/or elsewhere on the body. In particular, the mounting carrier supports itself with the two side support arms on the battery longitudinal carriers.

In particular, the base support arm is shorter than the spacing between the battery longitudinal carriers in the vehicle transverse direction. In particular, the base support arm is arranged in the longitudinal vehicle direction so as to be spaced apart from the rearward end of the battery longitudinal carriers. More specifically, the side support arms connect the ends of the base support arm to the rearward ends of the battery longitudinal carriers, respectively. In particular, the side support arms each extend from a rearward end of a battery longitudinal carrier to an end of the base support arm.

In particular, the chassis auxiliary frame comprises at least two frame longitudinal carriers. In particular, the frame longitudinal carriers are each supported with a frontward end on the base support arm. The frame longitudinal carriers are in particular the lower and preferably the lowest longitudinal carriers of the chassis auxiliary frame. In particular, the frame longitudinal carriers extend between the rear wheels connected to the chassis auxiliary frame.

The frame longitudinal carriers are in particular supported at one end of the base support arm. In particular, the frame longitudinal carriers are supported on the base support arm, where the side support arms are also attached to the base support arm. In particular, this results in two node points at which the frame longitudinal carrier and the side support arm and the base support arm meet for load transfer. In particular, in each case a frame longitudinal carrier and in each case a side support arm and the base support arm meet at a node.

In particular, the chassis auxiliary frame is designed so as to be cam-like or rectangular. The chassis auxiliary frame comprises carriers that extend in the vehicle longitudinal direction and in the vehicle transverse direction and also in the vehicle vertical direction. In particular, the rockers and the battery longitudinal carriers lie further outward than the frame longitudinal carriers and in particular in the forward travel direction ahead of the frame longitudinal carriers. In particular, the base support arm extends transversely to the frame longitudinal carriers.

In particular, the frame longitudinal carriers abut the body with their rearward ends. In particular, the frame longitudinal carriers extend diagonally forward and obliquely outward.

In particular, the side support arms extend obliquely forward and outward at a greater angle to the vehicle longitudinal axis than the frame longitudinal carriers. This allows a particularly advantageous load transfer from the frame longitudinal carriers, which are arranged further in the center of the vehicle, to the side support arms, and from there into the battery longitudinal carrier positioned on the edge of the vehicle.

The chassis auxiliary frame is in particular configured for rear steering. The rear axle chassis comprises in particular steerable wheels. In particular, the steerable rear wheels are provided as a supplement to steerable front wheels. The wheels of the rear axle are in particular steerably connected to the chassis auxiliary frame. The chassis auxiliary frame serves in particular to connect the rear axle chassis to the body. The vehicle substructure can comprise at least one rear axle chassis, in particular with steerable wheels and/or at least one body. In particular, the body is configured so as to be self-supporting. The applicant reserves the right to claim an at least semi-electrically driven motor vehicle having a vehicle substructure according to aspects of the invention.

In particular, the battery system serves to supply power to an electric traction drive. The battery system is in particular designed as an underbody battery. In particular, the battery device comprises a plurality of battery modules and/or battery cells. In particular, the battery system is arranged at least partially between the rockers. In particular, the battery support structure is attached to the rockers and/or to a body floor structure (in particular in the middle floor region). In the context of the present invention, information on the orientation relates in particular to an intended mounting position of the vehicle substructure on the vehicle. In particular, the indications relate to the vehicle coordinate system.

BRIEF DESCRIPTION OF THE DRAWINGS

Further advantages and features of the present invention arise from the embodiment examples, which are explained below with reference to the accompanying FIGS.
The Figures Show.

DETAILED DESCRIPTION OF THE INVENTION

Figure 1:
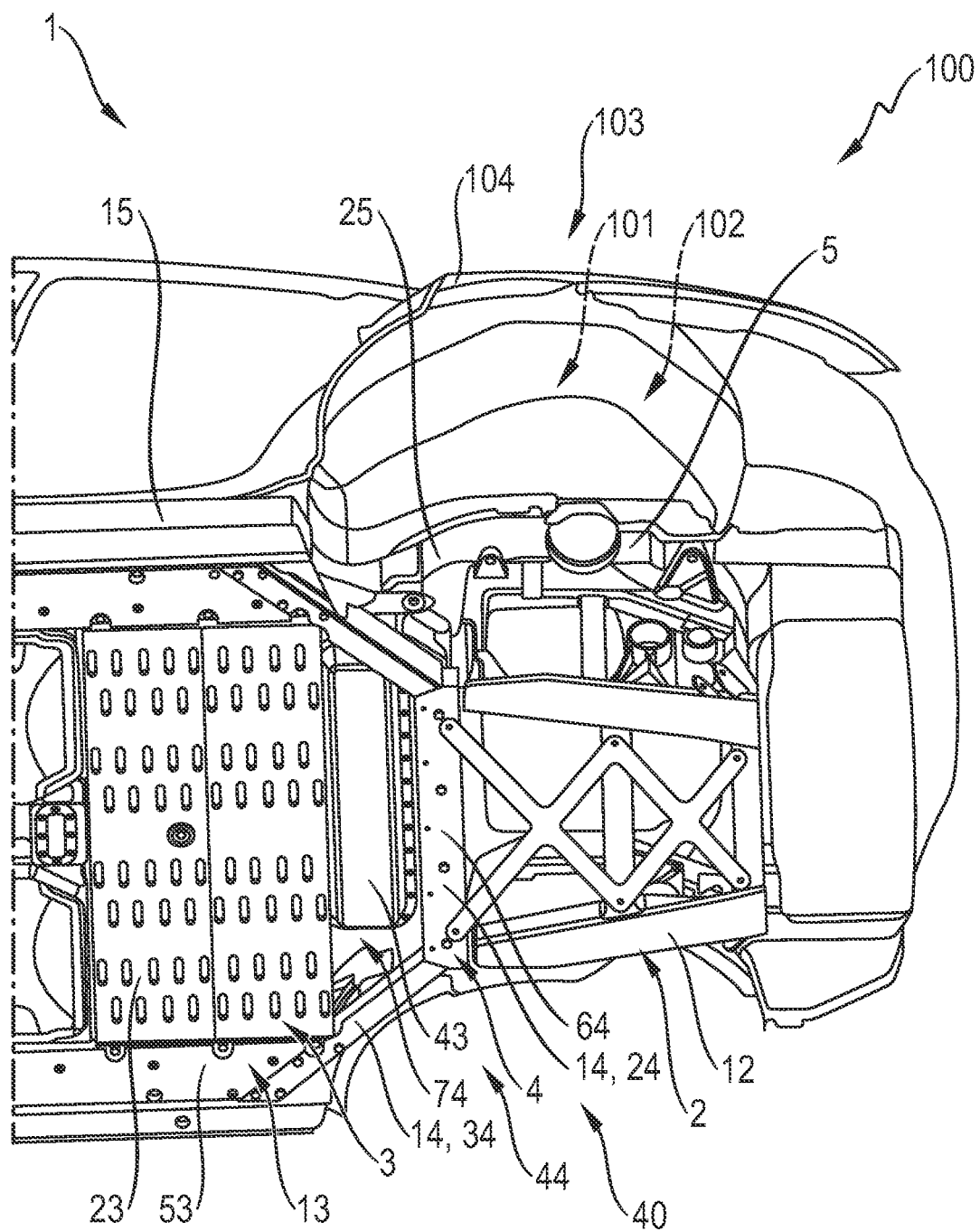
FIG. 1 a purely schematic view of a motor vehicle having a vehicle substructure according to aspects of the invention in a perspective side view obliquely from the bottom.
Figure 2:
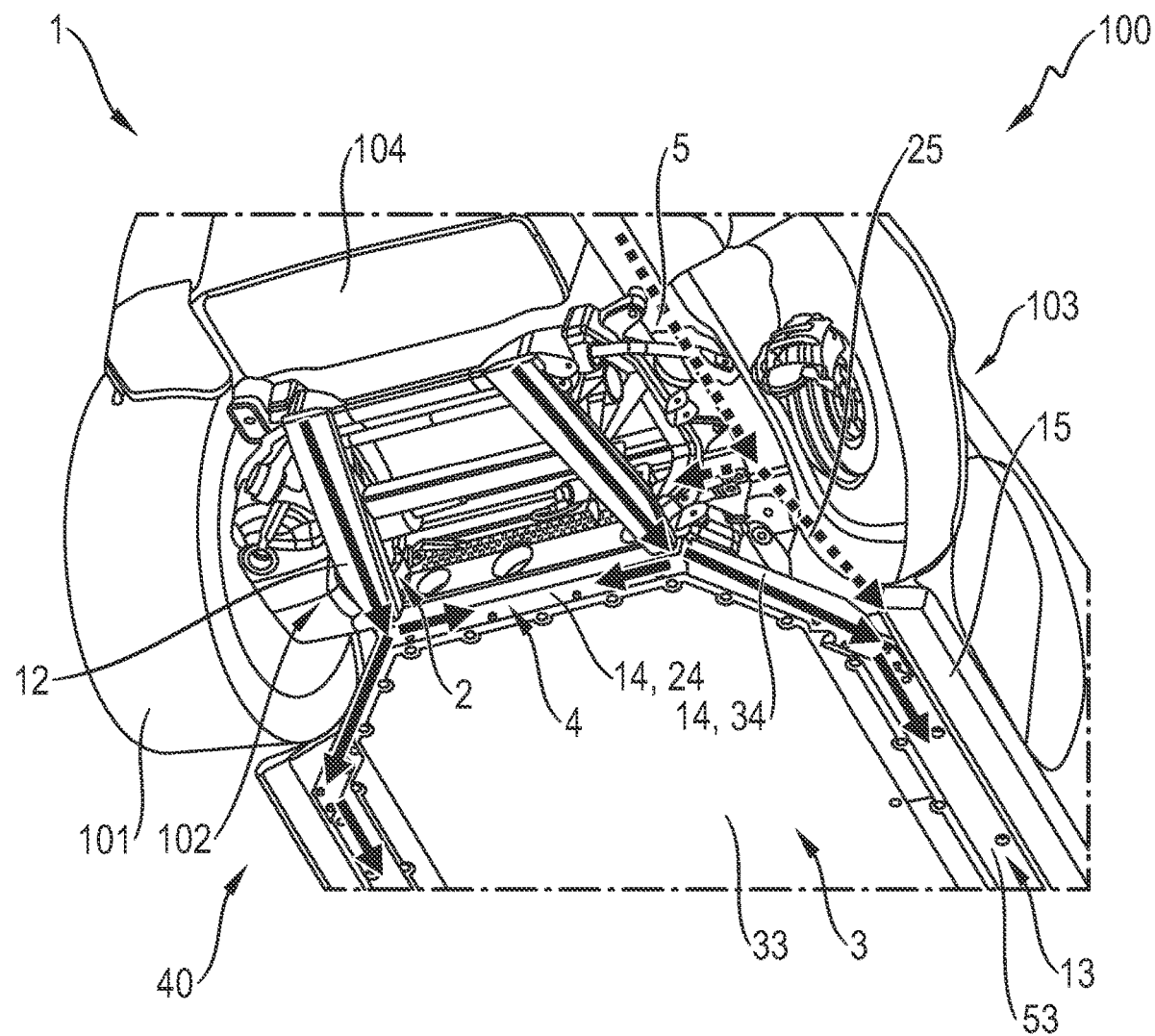
FIG. 2 the motor vehicle having the vehicle substructure according to FIG. 1 in a perspective rear view obliquely from the bottom.
Figure 3:
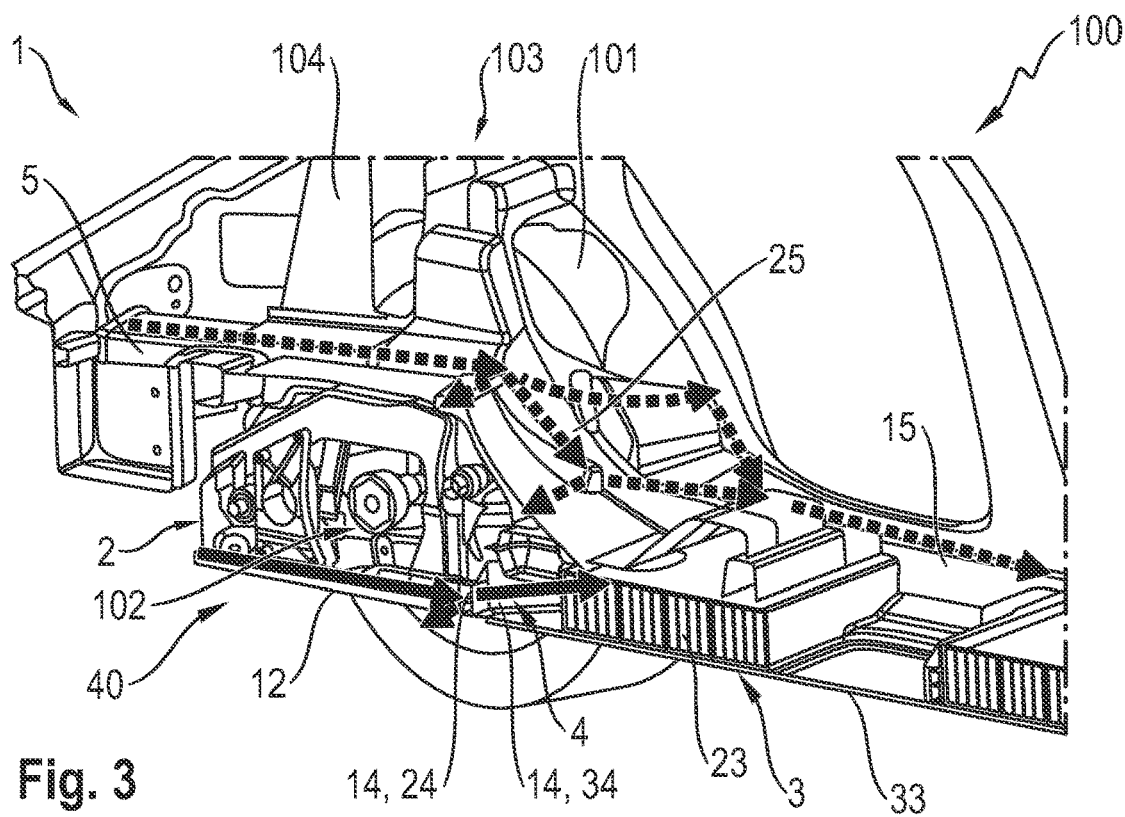
FIG. 3 the motor vehicle having the vehicle substructure according to FIG. 1 in a sectioned perspective side view obliquely from the front.

FIGS. 1 to 3 show a motor vehicle 100 with a vehicle substructure 1 according to aspects of the invention in different views and/or perspectives, which is driven purely electrically or semi-electrically. To supply power to an electric traction drive (not shown in greater detail herein), a battery system 3 is provided with a battery device 23 having battery cells.

The battery system 3 comprises a battery support structure 13 via which the battery device 23 is attached to a self-supporting body 104. The battery system 3 is configured as an underbody battery here and is accommodated between two rockers 15 in the vehicle 100. The battery support structure 13 here comprises two battery longitudinal carriers 53, which here extend along the inside of the vehicle along a respective rocker 15.

In the rear carriage 103, two longitudinal carrier units 5 are formed on the body 104. Each of the longitudinal carrier units 5 is connected to a rocker 15 via a crank structure 25.

The longitudinal carrier units 5 and the rockers 15 as well as the crank structures 25 are integral components of the body 104.

The vehicle 100 is here equipped with a rear axle chassis 102 having steerable rear wheels 101. In FIG. 1, the rear wheels 101 are not drawn. In FIGS. 2 and 3, the rear wheels 101 are outlined by a tire enveloping surface, which illustrates the movement space of a rear wheel 101 when steering. The rear axle chassis 102 is received on a chassis auxiliary frame 2, which is connected to the body 104 in the region of a rear carriage 103.

The chassis auxiliary frame 2 is configured in a cam-like manner here and comprises a plurality of carriers that extend in the vehicle longitudinal direction, in the vehicle transverse direction, or in the vehicle vertical direction and are connected to one another. Here, two frame longitudinal carriers 12 are provided in the lower region of the chassis auxiliary frame 2, which extend between the rear wheels 101 and terminate the chassis auxiliary frame 2 on the road side here.

A trapezoidal mounting carrier 4 is arranged between the battery system 3 and the chassis auxiliary frame 2. The mounting carrier 4 comprises three support arms 14 connected to one another and arranged in a plane. The support arms 14 comprise a base support arm 24 and two side support arms 34 attached at an angle to the base support arm 24.

Figure 4:
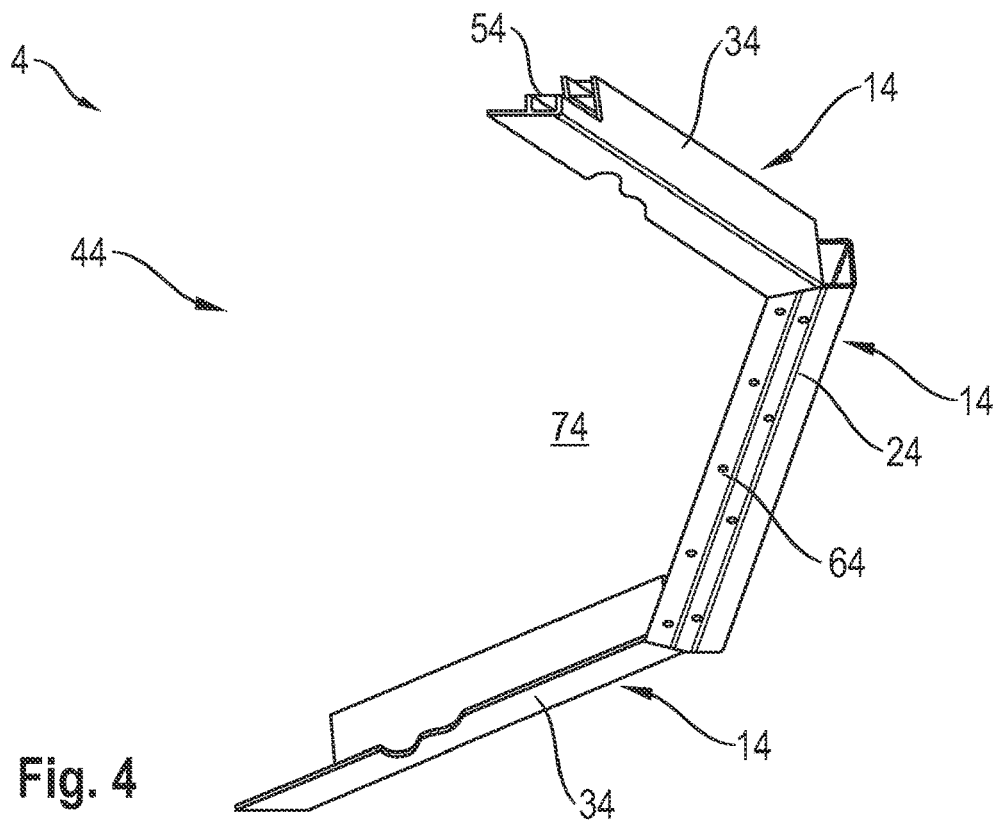
FIG. 4 a detail view of a mounting carrier of a vehicle substructure according to aspects of the invention.

The mounting carrier 4 is shown once again individually in FIG. 4. The support arms 14 are configured herein as extrusion profiles 54. As part of the mounting, the mounting carrier 4 can be handled as a single component, as shown in FIG. 4.

During mounting of the vehicle 100, the chassis auxiliary frame 2 and the battery system 3 are fixedly connected to one another via the mounting carrier 4, so as to create a pre-mounting assembly 40. The pre-mounting assembly 40 can then be married as a unit to the body 104. The mounting carrier 4 thus allows a simultaneous assembly of the chassis auxiliary frame 2 and the battery system 3, in which only a single component unit must be handled.

The mounting carrier 4 can be dismounted downwardly in the vehicle vertical direction in the fully mounted state, i.e. when the vehicle 100 is ready to drive. Then, the chassis auxiliary frame 2 and the battery system 3 can be independently dismounted from the body 104 in any sequence. Thus, the components 2, 3, 4 can be mounted as a pre-mounting assembly 40, but can be dismounted or serviced individually and independently as needed.

The chassis auxiliary frame 2 and the mounting carrier 4 and the battery support structure 13 together provide a lower load transfer plane for the load transfer in a crash event. The mounting carrier 4 is used in order to transfer load from the chassis auxiliary frame 2 into the battery support structure 13. For this purpose, the mounting carrier 4 is arranged here at a height of between 0 and 200 mm above the underbody clearance line. In this region, the frame longitudinal carriers 12 and the battery longitudinal carriers 53 also extend.

Thus, in a rear impact event, the chassis auxiliary frame 2 can support itself with its frame longitudinal carriers 12 on the base support arm 24. The base support arm 24 then transfers the introduced load obliquely forward and outward to the battery support structure 13 via the side support arms 34. From there, for example, the load can be discharged into the rockers 15 or other body regions, or can be discharged further into the battery support structure 13.

As a supplement to the lower load transfer plane, an upper load transfer plane is provided here. It extends above the longitudinal carrier units 5 arranged higher than the chassis auxiliary frame 2 and from there in the forward travel direction via the crank structures 25 forwardly and downwardly into the rockers 15. The crank structures 25 are thereby stressed to bending.

The load paths in the lower load transfer plane are outlined by arrows in FIGS. 2 and 3. The load paths of the upper load transfer plane are outlined by dashed arrows in FIGS. 2 and 3.

In order to be able to use a larger steering angle for the rear wheels 101, the crank structures 25 are here configured with a smaller cross-section or material usage than typically provided. This is made possible here by the fact that a portion of the loads expected in a crash event can also be reliably and securely received and/or discharged via the lower load transfer plane.

The maximum displayable crank cross-section depends essentially on the vehicle width, tire size, steering angle, and steering size as well as the position of the rear seating system. Because the crank structures 25 are loaded to bending, they must have a certain minimum cross-section. With the invention presented herein, the required crank cross-section can be significantly reduced, because, in addition to the upper load transfer plane, a further load path is introduced at a lower vehicle position, namely the lower load transfer plane. The necessary crank cross-section can thus be advantageously reduced, and an increased steering angle of the rear axle can be implemented without worsening the ergonomics of the second row of seats. A significantly smaller turning circle is also possible as a result.

As can be seen in FIG. 2, the battery system 3 can be terminated with a battery protection plate 33 for protection against roadside influences. For this purpose, the mounting carrier 4 is equipped with a mounting device 64 on which the battery protection plate can be mounted and, for example, screwed, at least in the rear part. The battery protection plate 33 can be attached from below and can also be detached again. In FIG. 1, the battery protection plate 33 is not shown for ease of reference.

The battery system 3 is equipped with an electronic control device 43 for battery control. The control device 43 is accommodated in a receiving space 74, which is spanned by the support arms 14 of the mounting carrier 4. This allows a secure and at the same time space-saving accommodation of control device 43. For example, a mounting flange for fastening the control means 43 is configured on at least one of the support arms 14.

The mounting carrier 4 also provides a protection apparatus 44 for protecting the battery system 3 before installation. Thus, the battery system 3 is reliably protected before and during mounting of the pre-mounting assembly 40. Such a protection apparatus 44 is increasingly frequently provided in the statutory regulations as a certification-relevant specification for electric vehicles. Due to the functional integration of the protection apparatus 44 in the mounting carrier 4, these requirements can be implemented in a particularly compact and weight-optimized manner and is also low-effort in terms of design.

The mounting carrier 4 fulfills a function both before and during the mounting of the chassis auxiliary frame 2 and battery system 3, as well as during the operation of the finished vehicle. It is both a critical tool for safety and ease of assembly by providing a pre-mounting assembly 40 consisting of the chassis auxiliary frame 2 and battery system 3, as well as a significant element in the load transfer during a crash event. Overall, the invention also achieves a significant weight reduction and more construction space for a rear axle steering.

LIST OF REFERENCE NUMBERS

1 Vehicle substructure
2 Chassis auxiliary frame
3 Battery system
4 Mounting support
5 Longitudinal carrier unit
12 Frame longitudinal carrier
13 Battery support structure
14 Support arm
15 Rocker
23 Battery device
24 Base support arm
Crank structure
33 Battery protection plate
34 Side support arm
35 Pre-mounting assembly
43 Control device
44 Protection apparatus
53 Battery longitudinal carrier
54 Extrusion profile
64 Mounting device
74 Receptacle space
100 Motor vehicle
101 Rear wheel
102 Rear axle chassis
103 Rear car
104 Body

What is claimed is:

1. A vehicle substructure for a motor vehicle, said vehicle substructure comprising:
   at least one chassis auxiliary frame for a rear axle chassis, which is connected to a body in a region of a rear carriage,
   at least one battery system arranged in a forward travel direction in front of the chassis auxiliary frame, the at least one battery system including a battery support structure for receiving at least one battery device, wherein the battery support structure is connected to the body, and
   at least one mounting carrier for transferring a load from the chassis auxiliary frame into the battery support structure in a crash event,
   wherein the at least one mounting carrier is configured to fixedly connect the chassis auxiliary frame and the battery system to one another prior to being installed in the vehicle, thereby providing a pre-mounting assembly, such that the pre-mounting assembly is configured to be married as a unit to the body and the mounting carrier is configured so as to be downwardly disengaged from the chassis auxiliary frame and the battery system upon the marriage of the pre-mounting assembly to the body, such that the chassis auxiliary frame and the battery system are configured to be dismounted from the body independently of one another,
   wherein the mounting carrier comprises at least three support arms including at least one base support arm extending in a vehicle transverse direction and at least two side support arms fixed angularly to the base support arm so that the mounting carrier is configured in a trapezoidal manner, and
   wherein the battery support structure comprises at least two battery longitudinal carriers extending in a vehicle longitudinal direction and wherein the battery longitudinal carriers are respectively connected by their rearward ends to one of the side support arms.

2. The vehicle substructure according to claim 1, wherein the mounting carrier is arranged from 0 to 200 mm above an underbody clearance line in relation to a vehicle vertical axis.

3. The vehicle substructure according to claim 1, wherein the mounting carrier includes a protection apparatus that is configured to selectively protect the battery system against mechanical impact before and during installation into the pre-mounting assembly and/or into the vehicle.

4. The vehicle substructure according to claim 1, wherein the chassis auxiliary frame and the mounting carrier and the battery support structure together provide a lower load transfer plane in the crash event.

5. The vehicle substructure according to claim 1, wherein the chassis auxiliary frame supports itself on the base support arm in the crash event, and wherein a load introduced by the chassis auxiliary frame is transferable from the base support arm via the side support arms diagonally forward and outward into the battery support structure.

6. The vehicle substructure according to claim 1, wherein the mounting carrier comprises at least one extrusion profile.

7. The vehicle substructure according to claim 1, wherein the battery system comprises at least one battery protection plate for protection against roadside mechanical influences, and wherein the mounting carrier comprises a mounting device for fastening the battery protection plate from below.

8. The vehicle substructure according to claim 1, wherein the support arms of the mounting carrier span a receiving space for an electronic control device of the battery system.

9. The vehicle substructure according to claim 1, wherein the base support arm is shorter than a space between the battery longitudinal carriers, and wherein the base support arm is arranged so as to be spaced apart in the vehicle longitudinal direction from the rearward ends of the battery longitudinal carriers, and wherein the side support arms connect the ends of the base support arm to the rearward ends of the battery longitudinal carriers.

10. The vehicle substructure according to claim 1, wherein the chassis auxiliary frame comprises at least two frame longitudinal carriers, each supported with a frontward end on the base support arm.

11. A vehicle comprising the vehicle substructure of claim 1.

12. The vehicle of claim 11, wherein the vehicle has steerable rear wheels.

13. A vehicle substructure for a motor vehicle, said vehicle substructure comprising:
   at least one chassis auxiliary frame for a rear axle chassis, which is connected to a body in a region of a rear carriage,
   at least one battery system arranged in a forward travel direction in front of the chassis auxiliary frame, the at least one battery system including a battery support structure for receiving at least one battery device, wherein the battery support structure is connected to the body, and
   at least one mounting carrier for transferring a load from the chassis auxiliary frame into the battery support structure in a crash event,
   (i) at least two longitudinal carrier units arranged in the rear carriage and positioned at least partially higher than the chassis auxiliary frame, (ii) at least two rockers arranged in a forward travel direction in front of the longitudinal carrier units and positioned lower than the longitudinal carrier units, and (iii) at least two crank structures, which are configured for transferring a load from at least one respective longitudinal carrier unit to at least one respective rocker in the crash event, and wherein the longitudinal carrier units, the crank structures and the rockers together provide an upper load transfer plane in a crash event, wherein the at least one mounting carrier is configured to fixedly connect the chassis auxiliary frame and the battery system to one another prior to being installed in the vehicle, thereby providing a pre-mounting assembly, such that the pre-mounting assembly is configured to be married as a unit to the body and the mounting carrier is configured so as to be downwardly disengaged from the chassis auxiliary frame and the battery system upon the marriage of the pre-mounting assembly to the body, such that the chassis auxiliary frame and the battery system are configured to be dismounted from the body independently of one another.

14. The vehicle substructure according to claim 13, wherein, for gaining design space for steerable rear wheels of the vehicle, the crank structures have reduced component dimensions, and wherein a load transfer in an upper load transfer plane reduced by smaller component dimensions is at least compensated by a lower load transfer plane.

* * * * *